(12) United States Patent
Wang et al.

(10) Patent No.: US 7,944,096 B2
(45) Date of Patent: May 17, 2011

(54) STATOR MECHANISM OF LINEAR MOTOR

(75) Inventors: Tse-Ching Wang, Taichung (TW); Yu-Feng Ding, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 97 days.

(21) Appl. No.: 12/479,173

(22) Filed: Jun. 5, 2009

(65) Prior Publication Data

US 2010/0308669 A1 Dec. 9, 2010

(51) Int. Cl.
*H02K 41/02* (2006.01)
(52) U.S. Cl. .................................... 310/12.25
(58) Field of Classification Search ..... 310/12.01–12.33
See application file for complete search history.

(56) References Cited

U.S. PATENT DOCUMENTS

| 6,313,551 | B1 * | 11/2001 | Hazelton | 310/12.24 |
| 6,812,598 | B2 * | 11/2004 | Cheung et al. | 310/30 |
| 2007/0205672 | A1 * | 9/2007 | Nozawa et al. | 310/12 |

* cited by examiner

*Primary Examiner* — Hanh N. Nguyen
(74) *Attorney, Agent, or Firm* — Guice Patents PLLC

(57) ABSTRACT

A stator mechanism of linear motor. The stator mechanism includes multiple magnetic members. The magnetic members are sequentially arranged along a predetermined straight line with the magnetic poles of the same polarity adjacent to each other to repel each other. Each magnetic member includes at least two magnetic bodies, which are coaxially arranged with the magnetic poles of different polarities adjacent to each other to attract each other.

6 Claims, 8 Drawing Sheets

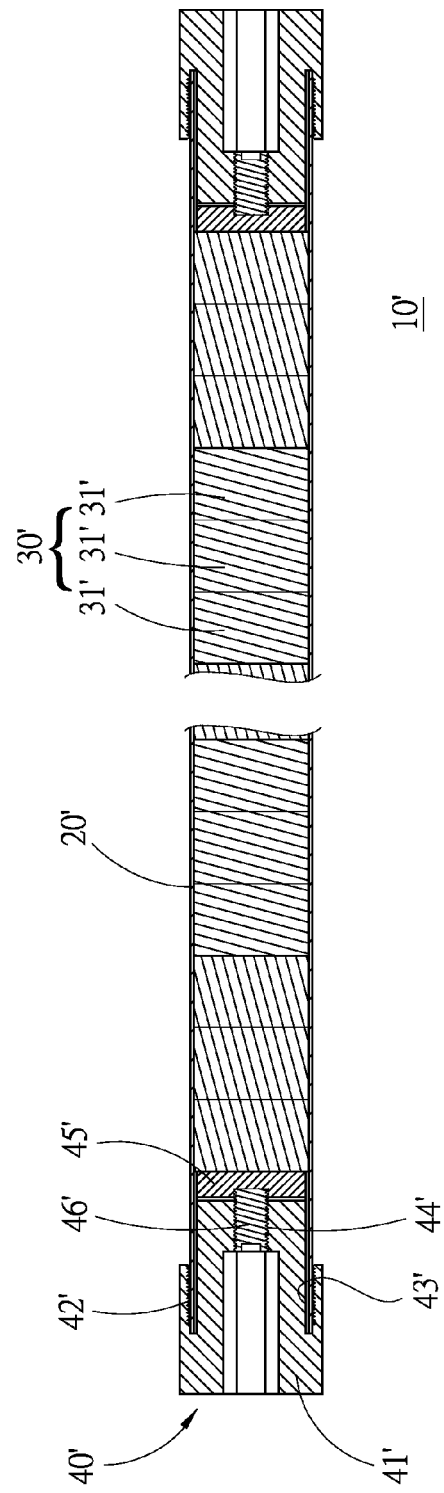
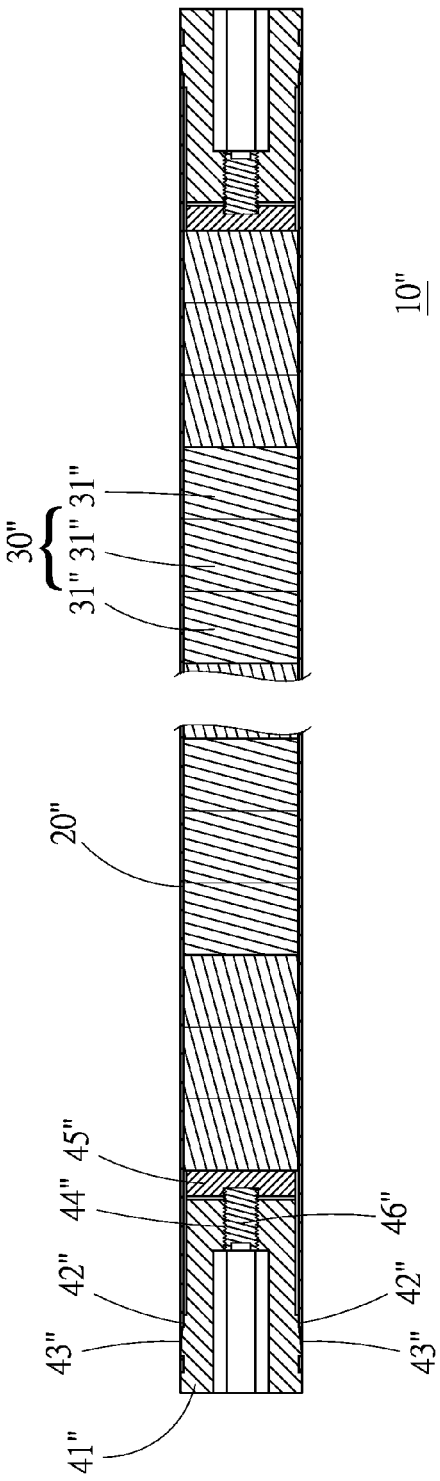
Fig. 7
Fig. 8

STATOR MECHANISM OF LINEAR MOTOR

BACKGROUND OF THE INVENTION

The present invention relates to a driving technique, and more particularly to a stator mechanism of linear motor.

FIGS. 1 and 2 show a conventional rod-shaped motor stator structure 1. The motor stator structure 1 includes a threaded rod 3 and multiple magnetic rings 2 coaxially fitted on the threaded rod 3 to repel each other. Two threaded retaining collars 4 are screwed on two ends of the threaded rod 3 to tighten and locate the magnetic rings 2 on the threaded rod 3 so as to form the stator of the linear motor.

In the conventional stator structure 1, multiple magnetic rings 2 are fixed on the threaded rod 3. Therefore, the stator includes numerous components. This leads to high material cost and high manufacturing cost. This is not economical in industry. Moreover, the magnetic rings 2 are arranged with the magnetic poles of the same polarity adjacent to each other to repel each other. In this case, the stator can hardly exert optimal magnetic push force onto the rotor. This is undesired and needs to be improved.

SUMMARY OF THE INVENTION

It is therefore a primary object of the present invention to provide a stator mechanism of linear motor. The stator mechanism includes multiple magnetic members and is able to exert greater push force onto the rotor of the motor to enhance the practicality of the linear motor.

It is a further object of the present invention to provide the above stator mechanism of linear motor, which includes less components and has simplified structure so that the manufacturing cost and material cost for the stator mechanism are reduced to promote economic benefit.

According to the above objects, the stator mechanism of linear motor of the present invention includes multiple magnetic members. The magnetic members are sequentially arranged along a predetermined straight line with the magnetic poles of the same polarity adjacent to each other to repel each other. Each magnetic member includes at least two magnetic bodies, which are coaxially arranged with the magnetic poles of different polarities adjacent to each other to attract each other.

The stator mechanism of the present invention further includes a sleeve with a predetermined length, in which the magnetic members are coaxially received. Two end pieces are respectively disposed at two ends of the sleeve for tightening and locating the magnetic members in the sleeve.

The present invention can be best understood through the following description and accompanying drawings wherein:

BRIEF DESCRIPTION OF THE DRAWINGS

FIG. 7 is a sectional view of a second embodiment of the stator mechanism of the present invention;

FIG. 8 is a sectional view of a third embodiment of the stator mechanism of the present invention.

DETAILED DESCRIPTION OF THE PREFERRED EMBODIMENTS

Figure 1:
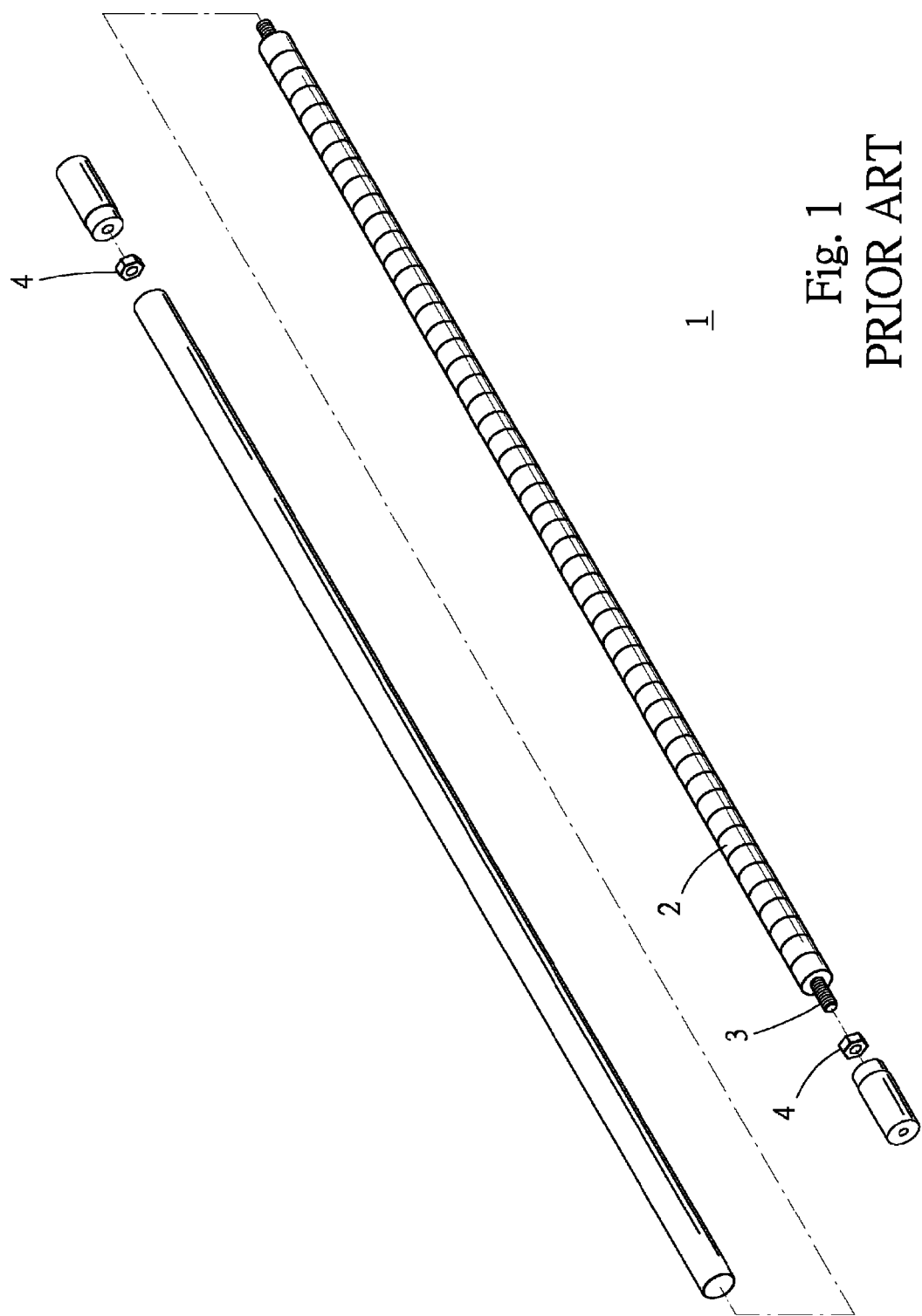
FIG. 1 is a perspective exploded view of a conventional motor stator structure.
Figure 2:
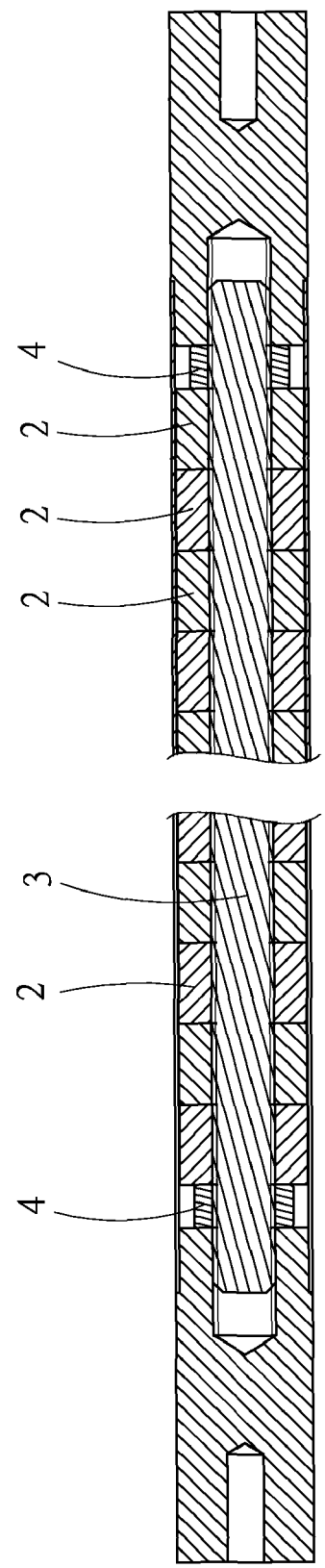
FIG. 2 is a sectional view of the conventional motor stator structure.
Figure 3:
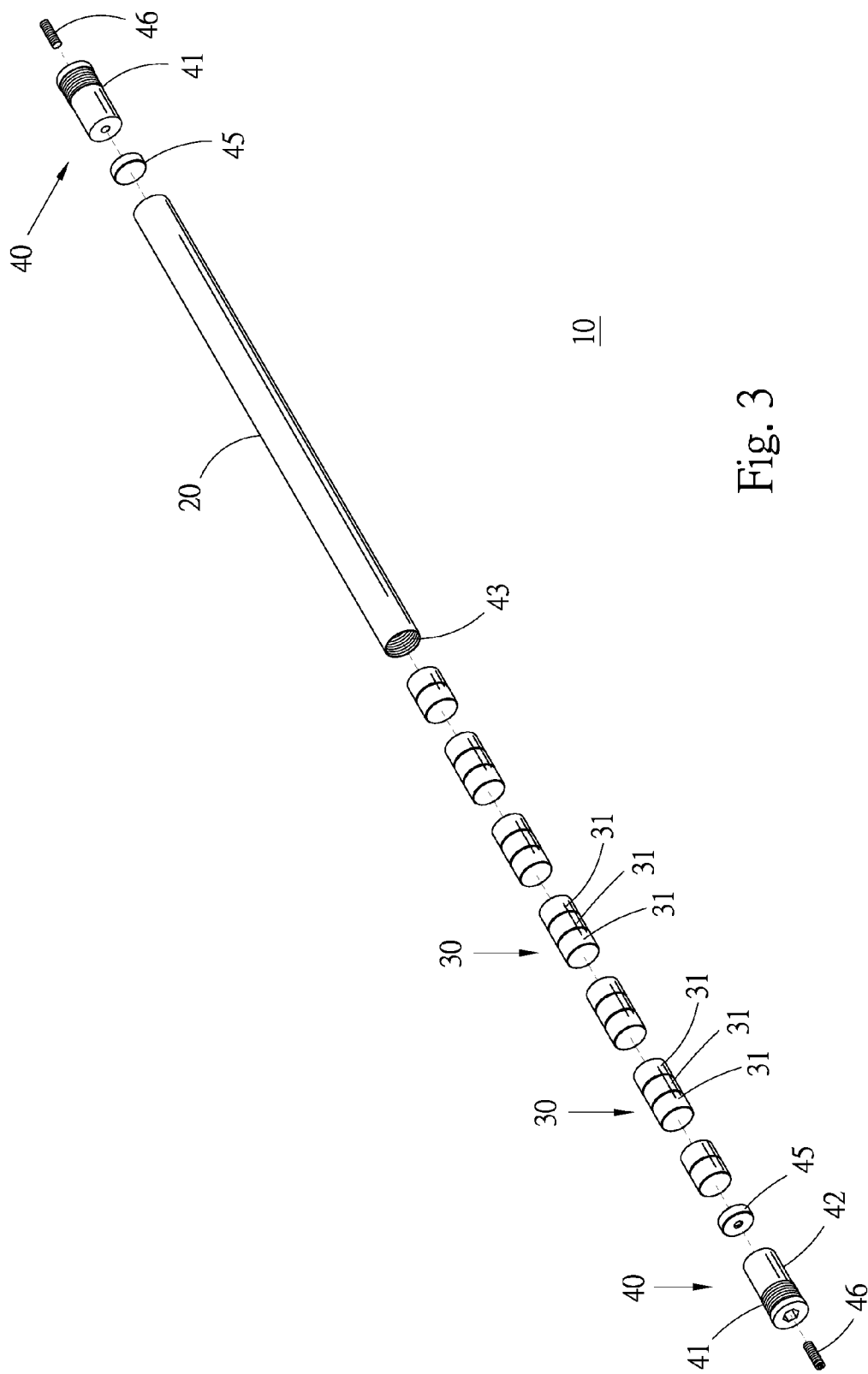
FIG. 3 is a perspective exploded view of a first embodiment of the stator mechanism of the present invention.
Figure 4:
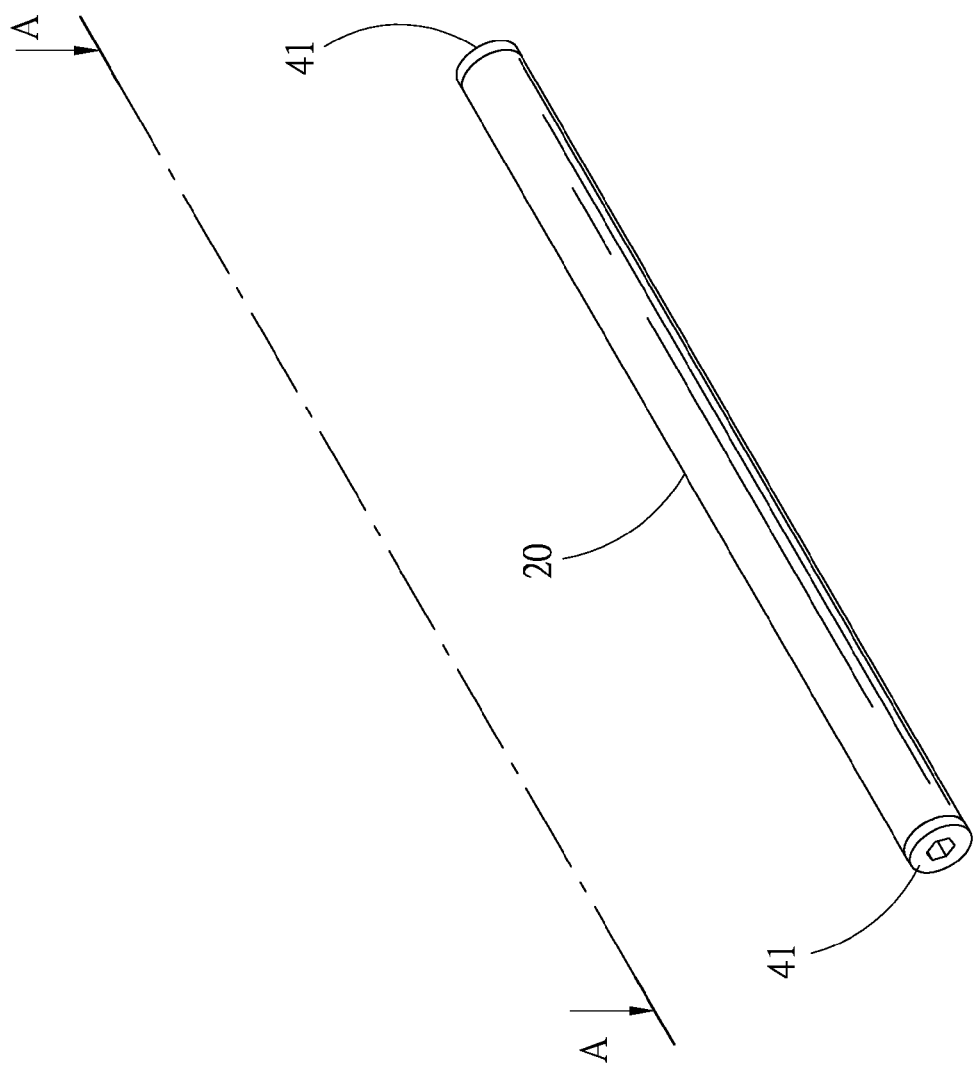
FIG. 4 is a perspective assembled view of the first embodiment of the stator mechanism of the present invention.
Figure 5:
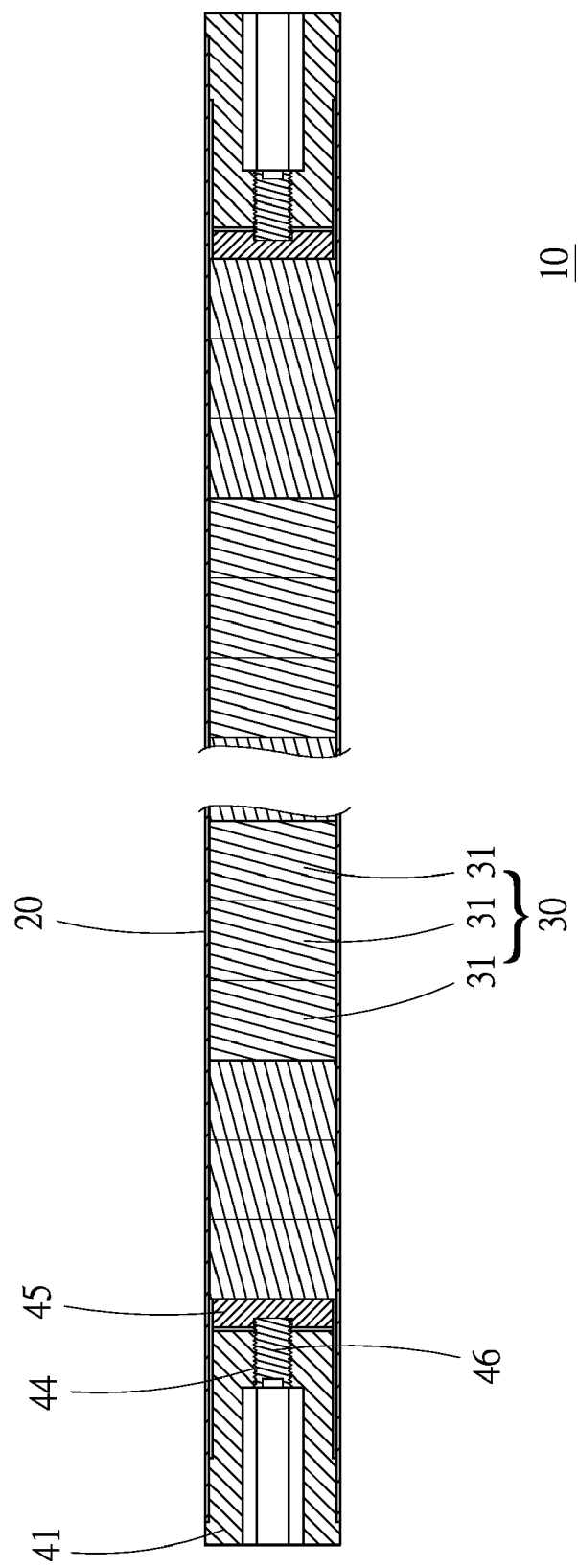
FIG. 5 is a sectional view taken along line A-A of FIG. 4.
Figure 6:
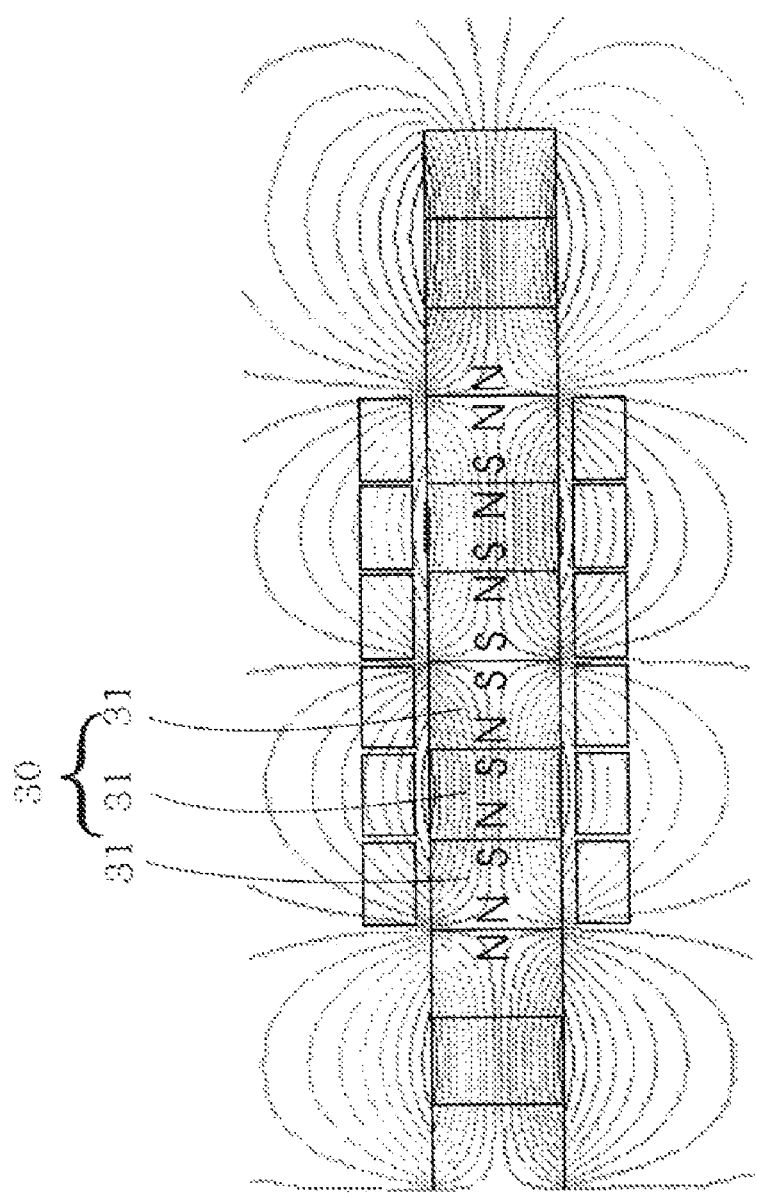
FIG. 6 is a diagram showing the magnetic lines of force of the first embodiment of the stator mechanism of the present invention.

Please refer to FIGS. 3 to 6. According to a first embodiment, the stator mechanism 10 of linear motor includes a sleeve 20, several magnetic members 30 and two end pieces 40.

The sleeve 20 is a straight tubular body with a certain length.

The magnetic members 30 are sequentially arranged along an axis of the sleeve 20 and received in an internal space of the sleeve 20 with the magnetic poles of the same polarity adjacent to each other to repel each other. Each magnetic member 30 includes multiple cylindrical magnetic bodies 31, which are coaxially arranged with the magnetic poles of different polarities adjacent to each other to attract each other. Preferably, each magnetic member 30 includes three magnetic bodies 31.

The end pieces 40 are respectively fixedly disposed at two ends of the sleeve 20 for restricting the magnetic members 30 within the sleeve 20. The end pieces 40 also exert tightening force onto the repelling magnetic members 30 to keep them adjacent to and abut against each other. To speak more specifically, each end piece 40 has a cylindrical end plug 41 coaxially fitted in one end of the sleeve 20. A first thread 42 is formed on an outer circumference of the end plug 41, while a second thread 43 is formed on an inner circumference of the end of the sleeve 20. The first thread 42 can be screwed with the second thread 43 to fix the end plug 41 with the sleeve 20. A threaded hole 44 is formed through the end plug 41. The threaded hole 44 is coaxial with the sleeve 20. A circular packing push block 45 is coaxially received in the sleeve 20 in abutment with one side of an adjacent magnetic member 30. A fastening member 46, which is a bolt, is axially movably screwed through the threaded hole 44. One end of the fastening member 46 extends into the sleeve 20 to connect with the push block 45. The fastening member 46 via the push block 45 pushes the adjacent magnetic members 30 to move into the sleeve 20, whereby the repelling magnetic members 30 are tightened to attach to and abut against each other.

According to the above arrangement, the magnetic members 30 of the stator mechanism 10 of the present invention can be directly securely located in the sleeve 20 without the threaded rod in the conventional stator structure. Therefore, the manufacturing cost and material cost for the stator mechanism 10 of the linear motor are reduced to achieve better economic benefit.

Furthermore, the magnetic member 30 of the stator mechanism 10 of the linear motor is composed of multiple magnetic bodies 31 rather than one single magnetic ring as in the conventional stator structure. Therefore, the stator of the present invention is able to exert greater push force onto the rotor of the motor to enhance the practicality of the linear motor.

It should be noted that the present invention is characterized in that each magnetic member 30 is composed of multiple magnetic bodies 31, which are arranged with the magnetic poles of different polarities adjacent to each other to attract each other. Therefore, the shape of the magnetic body 31 is not limited to the aforesaid cylindrical shape in the first embodiment.

Figure 9:
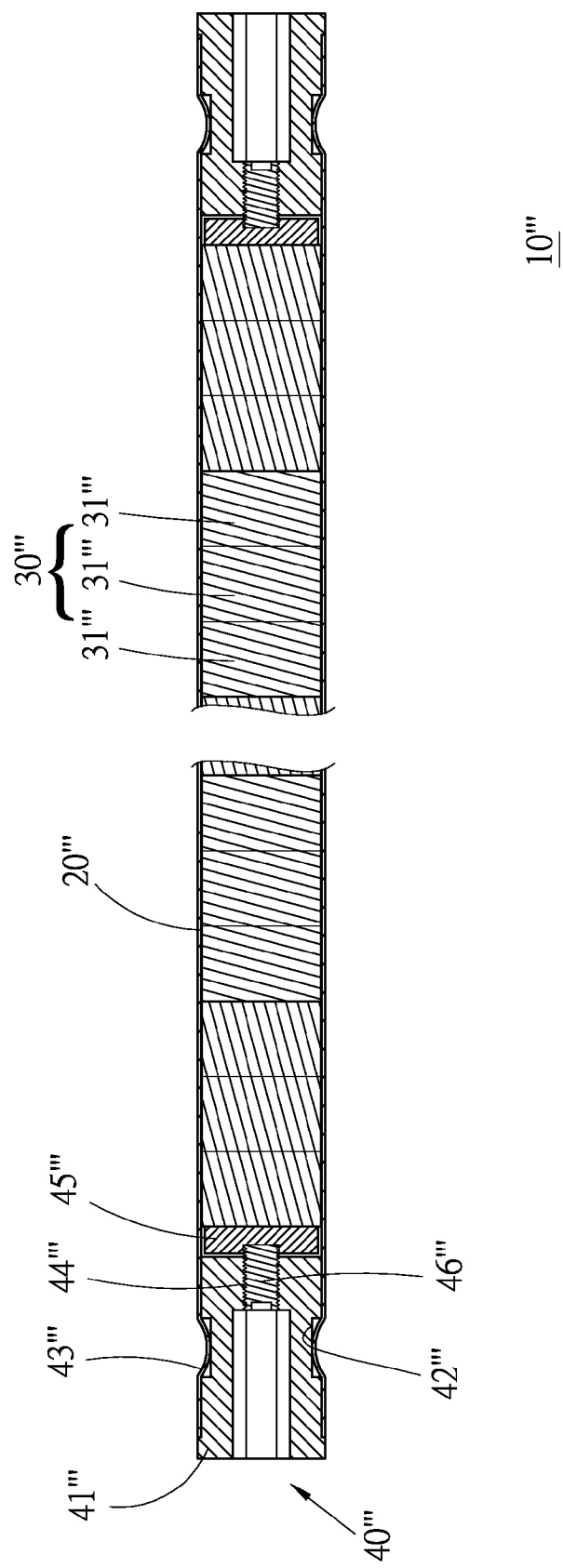
FIG. 9 is a sectional view of a fourth embodiment of the stator mechanism of the present invention.

It should be also noted that the structure of the end piece is not limited to the aforesaid structure in the first embodiment. FIGS. 7, 8 and 9 show a second embodiment, a third embodiment and a fourth embodiment of the present invention respectively.

FIG. 7 shows the second embodiment of the present invention, in which the stator mechanism 10' of the linear motor is different from the first embodiment only in that the first and second threads 42', 43' are arranged in a different manner. To speak more specifically, in the second embodiment, the first thread 42' is formed on an inner circumference of the end plug 41', while the second thread 43' is formed on an outer circumference of the end of the sleeve 20'.

FIG. 8 shows a third embodiment of the present invention, in which the stator mechanism 10" of the linear motor is different from the first embodiment only in that the end plug 41" is connected with the sleeve 20" by means of engagement instead of the threads. That is, the end of the sleeve 20" is formed with several engaging holes 42", while several engaging protrusions 43" are formed on the circumference of the end plug 41". The engaging protrusions 43" can be engaged in the engaging holes 42" to connect the end plug 41" with the end of the sleeve 20".

FIG. 9 shows a fourth embodiment of the present invention, in which the end plug 41''' of the stator mechanism 10''' is also connected with the sleeve 20''' by means of engagement as in the third embodiment. The circumference of the end plug 41''' is formed with an annular engaging groove 42'''. The center of curvature of the annular engaging groove 42''' coincides with the axis of the sleeve 20'''. The inner circumference of the sleeve 20''' is formed with an annular engaging rib 43''' inward protruding from the inner circumference of the sleeve 20'''. The center of curvature of the annular engaging rib 43''' coincides with the axis of the sleeve 20'''. The engaging rib 43''' can be engaged in the engaging groove 42''' to fixedly connect the end plug 40''' with the sleeve 20'''.

The above embodiments are only used to illustrate the present invention, not intended to limit the scope thereof. Many modifications of the above embodiments can be made without departing from the spirit of the present invention.

What is claimed is:

1. A stator mechanism of linear motor, comprising several magnetic members sequentially arranged along a predetermined straight line with the magnetic poles of the same polarity adjacent to each other to repel each other, the stator mechanism being characterized in that each magnetic member includes at least two magnetic bodies, which are arranged with the magnetic poles of different polarities adjacent to each other to attract each other; and a sleeve with a predetermined length, the sleeve having an internal space in which the magnetic members are received, two end pieces being respectively fixedly connected with two ends of the sleeve for holding the magnetic members in the sleeve and tightening the magnetic members to abut against each other;

wherein each end piece has an end plug fixedly disposed at one end of the sleeve, a push block being slidably disposed in the end of the sleeve in abutment with an adjacent magnetic member, a fastening member being disposed on the end plug and movable along an axis of the sleeve, the fastening member serving to push the push block to move within the sleeve along the axis thereof into a tightened state in which the magnetic members attach to and abut against each other.

2. The stator mechanism of linear motor as claimed in claim 1, wherein the magnetic bodies are cylindrically shaped and are coaxially arranged.

3. The stator mechanism of linear motor as claimed in claim 1, wherein the fastening member is a bolt screwed in the end plug, one end of the fastening member extending into the sleeve to connect with the push block.

4. The stator mechanism of linear motor as claimed in claim 1, wherein a first connection thread is formed on a circumference of the end plug, while a second connection thread is formed on a circumference of the end of the sleeve, whereby the first connection thread can be screwed with the second connection thread to connect the end plug with the sleeve.

5. The stator mechanism of linear motor as claimed in claim 1, wherein the end of the sleeve is formed with at least one engaging hole, while at least one engaging protrusion is formed on the circumference of the end plug for engaging in the engaging hole.

6. The stator mechanism of linear motor as claimed in claim 1, wherein an annular engaging groove is formed on the circumference of the end plug, the center of curvature of the annular engaging groove coinciding with the axis of the sleeve, an annular rib being formed on an inner circumference of the sleeve to inward protrude therefrom, the center of curvature of the annular engaging rib coinciding with the axis of the sleeve, whereby the engaging rib can be engaged in the engaging groove.

\* \* \* \* \*